US010025032B2

(12) United States Patent
Hamaguchi et al.

(10) Patent No.: US 10,025,032 B2
(45) Date of Patent: Jul. 17, 2018

(54) ALIGNMENT DEVICE, SPLICING DEVICE, ALIGNING METHOD, AND SPLICING METHOD FOR OPTICAL FIBERS

(71) Applicant: FUJIKURA LTD., Tokyo (JP)

(72) Inventors: Hiroki Hamaguchi, Sakura (JP); Nobuo Kuwaki, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/019,416

(22) Filed: Feb. 9, 2016

(65) Prior Publication Data
US 2016/0161673 A1 Jun. 9, 2016

(30) Foreign Application Priority Data
Aug. 23, 2013 (JP) ................................. 2013-173580

(51) Int. Cl.
*G02B 6/255* (2006.01)
*G02B 6/02* (2006.01)
(Continued)

(52) U.S. Cl.
CPC ....... *G02B 6/2555* (2013.01); *G02B 6/02042* (2013.01); *G02B 6/2553* (2013.01); *G06T 7/0004* (2013.01); *G02B 6/4221* (2013.01)

(58) Field of Classification Search
CPC ... G02B 6/3843; G02B 6/4226; G02B 6/3885
See application file for complete search history.

(56) References Cited

U.S. PATENT DOCUMENTS 5,748,820 A 5/1998 Le Marer et al.
2002/0197037 A1* 12/2002 Bailey .................... G01L 1/242
385/123

(Continued)

FOREIGN PATENT DOCUMENTS

JP          8-304667 A     11/1996
JP     2001-83362 A      3/2001
(Continued)

OTHER PUBLICATIONS

Kazuyuki Yoshida, et al., "Fusion splicer for specialty optical fiber with advanced functions", Fujikura Technical Journal, [Online], Apr. 2011, pp. 12-15, No. 120, (retrieval date Sep. 17, 2014).
(Continued)

*Primary Examiner* — Jodi C Franklin
(74) *Attorney, Agent, or Firm* — Sughrue Mion, PLLC

(57) ABSTRACT

An optical fiber alignment device includes an image-capturing device capturing images of end surfaces of two optical fibers; an image-analyzing device obtaining position coordinates of two or more cores in the end surfaces from the image captured by the image-capturing device for each of the two optical fibers; a calculation device substituting the position coordinates of the cores obtained for each of the optical fibers in a theoretical equation that represents a total sum of axial deviation losses at the time of splicing the cores to each other, the calculation device obtaining a positional relationship between the end surfaces of the optical fibers from the theoretical equation such that the total sum of the axial deviation losses becomes a minimum; and a driving device arranging the optical fibers such that the end surfaces of the optical fibers satisfy the positional relationship obtained by the calculation device.

8 Claims, 3 Drawing Sheets

(51) Int. Cl.
G02B 6/42 (2006.01)
G06T 7/00 (2017.01)

(56) References Cited

U.S. PATENT DOCUMENTS

2003/0198439 A1* 10/2003 Hiramatsu ............ G02B 6/122
385/39
2003/0230000 A1* 12/2003 Tsuda .................. G02B 6/4226
33/645

FOREIGN PATENT DOCUMENTS

| JP | 2004-53625 A | 2/2004 |
|---|---|---|
| JP | 2011-158768 A | 8/2011 |
| JP | 2013-50695 A | 3/2013 |
| JP | 2013-54116 A | 3/2013 |
| JP | 2013-130771 A | 7/2013 |
| WO | 2013/058143 A1 | 4/2013 |

OTHER PUBLICATIONS

Kazuyuki Yoshida, et al., "Fusion splicer for specialty optical fiber with advanced functions", Fujikura Technical Review, [Online], Jan. 2012, pp. 10-13, No. 41, (retrieval date Sep. 17, 2014).
Communication dated May 23, 2017, from the Japanese Patent Office in counterpart Japanese application No. 2013-173580.
Notice of Allowance dated Dec. 12, 2017 from the Japanese Patent Office in counterpart application No. 2013-173580.

\* cited by examiner

ALIGNMENT DEVICE, SPLICING DEVICE, ALIGNING METHOD, AND SPLICING METHOD FOR OPTICAL FIBERS

CROSS REFERENCE TO RELATED APPLICATIONS

This application is a continuation application based on a PCT Patent Application No. PCT/JP2014/068153, filed Jul. 8, 2014, whose priority is claimed on Japanese Patent Application No. 2013-173580, filed Aug. 23, 2013, the content of which is hereby incorporated by reference.

BACKGROUND OF THE INVENTION

Field of the Invention

The present invention relates to an alignment device, a splicing device, an aligning method, and a splicing method for optical fibers having two or more cores such as multi-core fibers.

Description of Related Art

In recent years, internet traffic has continued to increase, and thus, the transmission capacity for an optical fiber configuring a communication network is required to be increased. As a key technology in this area, a technology of a multi-core fiber in which one optical fiber has a plurality of cores configuring transmission paths has attracted attention.

Since multi-core fibers have characteristics of having cores at various positions in the cross-section of the fiber, research and development relating to the input and output technology of the multi-core fiber is being actively carried out.

As a method for splicing optical fibers, a fusion splice using a fusion splicer can be included.

A general aligning method using a fusion splicer in the related art is as follows.

Firstly, a reference light is launched into a side surface of a bare fiber of which the coating is removed to observe an internal structure from the side surface, then, a boundary between the core and cladding can be recognized from a refractive index difference between the core and the cladding. Therefore, the boundaries between the core and cladding of two bare fibers facing each other are matched by a two-axis operation in the x-axis and the y-axis, and then, the two bare fibers can be aligned.

On the other hand, in splicing multi-core fibers, each of the plurality of cores is required to be aligned. That is, it is necessary to match the core arrangements in the cross-sectional surfaces of fibers facing each other. However, in the side surface observing method in the related art, there are many problems such as a problem in which it is difficult to recognize the boundaries between the core and cladding for all the cores in the multi-core fiber because the plurality of cores overlap in the front of and behind in the observing direction.

Therefore, as the splicing method for multi-core fibers using the fusion splicer in the related art, there is a method in which, after roughly aligning the cores based on the outer diameter of the fibers, while actually causing measurement light to pass through any of the cores and measuring the transmittance, the cores are aligned until the transmittance becomes a maximum (the splice loss becomes a minimum) (for example, refer to Patent Document 1 (Japanese Unexamined Patent Application, First Publication No. 2013-54116)).

As another example of the aligning method, a method of giving a specific marker to multi-core fibers is known (for example, refer to Patent Document 2 (Japanese Unexamined Patent Application, First Publication No. 2011-158768) and Patent Document 3 (Japanese Unexamined Patent Application, First Publication No. 2013-50695)).

In addition, even though the method described below is not related to multi-core fibers but related to optical fibers having a plurality of holes extending parallel in the cores such as a photonic crystal fiber, a method is disclosed in Patent Document 4 (Japanese Unexamined Patent Application, First Publication No. 2004-53625), in which a position of end surfaces of optical fibers are observed and the positions of the optical fibers are adjusted such that cores of both the optical fibers are on the same axis and the holes are arranged so as to overlap each other.

The splicing method in the related art is a method in which, being limited to multi-core fibers having completely the same design, two specific points are aligned, and then, all the cores can be aligned. This concept is based on a mathematical theory that, when two points in a diagram existing on a plane space are determined, ideally, the position of the diagram is uniquely determined. Therefore, when the technology in the related art is used, ideally, the cores of the two optical fibers to be spliced are completely matched, and the splice loss becomes a minimum value. However, this technology in the related art is based on the assumption that the core positions in the end surfaces of the two optical fibers facing each other completely match.

In the actual splicing of multi-core fibers, the core positions in the end surfaces of the fibers deviate from the designed positions. A deviation with respect to the designed positions cannot be avoided in manufacturing. However, in a real situation, the deviations are not inherently assumed and are randomly distributed. Therefore, in a case where the deviations in the core positions are considered, according to the related art, it is possible to minimize a value of splice loss for specific arbitrary cores selected at the time of aligning. However, with regard to the other cores, there is a possibility that the positional relationships between the specific selected cores and the other cores in the fibers are not the same due to the influence of the random deviations. Therefore, even when the alignment is performed such that the value of splice loss for the specific selected cores is minimized, since the splice loss for other cores may become larger than the minimum value, the average splice loss for all the spliced cores does not always become the minimum value.

Of course, by slightly moving the optical fibers facing each other while the reference light is incident on all the cores, it may be possible to search for the position where the total sum of the splice losses of all the cores becomes a minimum value, but this is not so realistic and is very difficult.

In the methods disclosed in Patent Document 2 and Patent Document 3, the marker needs to be given to the multi-core fibers in advance, and thus, these may not be highly versatile methods.

In the method disclosed in Patent Document 4, if the positions of each core do not deviate from each other, it is possible to search for the positions where the cores overlap each other. However, in a case where the positions of each core deviate from each other and an axial deviation cannot be avoided from being generated on a part of the cores, it is not possible to obtain the position where all the cores overlap each other.

Briefly describing these problems in the related art, all of these technologies are very effective methods in a case where the core positions of the multi-core fibers are completely the same. However, in the multi-core fibers as an actual information transmission path, it is considered that there cannot be a situation in which the core positions of the multi-core fibers are completely the same.

For example, in a case of constructing a new transmission path, it is possible to consistently use the same fibers. However, in a case of repairing or extending an existing transmission path, there is a high probability that fibers having different biases of deviations of the core positions will be mixed, such as fibers from different manufacturers or fibers manufactured by different methods. Even if the core positions in the specifications of two optical fibers are the same within an allowable tolerance range, when optical fibers are actually made to face to each other, since the tendencies of the deviations of the cores in both the optical fibers are opposite to each other, there is a possibility that the axial deviation becomes large. For example, when a distance between the cores in a certain optical fiber is shorter than that in the specifications, in a case of splicing the optical fiber to an optical fiber having the same short distance between the cores, the axial deviation does not easily increase. However, on the contrary, in a case of splicing the optical fiber to an optical fiber having a long distance between the cores, there is a possibility that the axial deviation may exceed the allowable tolerance. In addition, even when multi-core fibers are manufactured by the same manufacturing method by the same manufacturer, in a case where the manufacturing lots are different from each other or the longitudinal positions are different from each other, deviations of the core positions may be different, and thus, there is a possibility that the minimum average loss will not be able to be obtained.

As described above, there have been many problems in the related art from the viewpoint of versatility.

SUMMARY OF THE INVENTION

The present invention aims to provide an alignment device, a splicing device, an aligning method, and a splicing method for optical fibers in which each core of the optical fibers having two or more cores can be spliced with a smaller splice loss.

In order to solve the problems described above, an optical fiber alignment device for aligning optical fibers having two or more cores in a first aspect of the present invention includes: an image-capturing device configured to capture images of end surfaces of two optical fibers; an image-analyzing device configured to obtain position coordinates of two or more cores in the end surfaces from the image captured by the image-capturing device for each of the two optical fibers; a calculation device configured to substitute the position coordinates of the two or more cores obtained for each of the two optical fibers in a theoretical equation that represents a total sum of axial deviation losses at the time of splicing the two or more cores to each other, the calculation device being configured to obtain a positional relationship between the end surfaces of the two optical fibers from the theoretical equation such that the total sum of the axial deviation losses becomes a minimum; and a driving device configured to arrange the two optical fibers such that the end surfaces of the two optical fibers satisfy the positional relationship obtained by the calculation device.

In addition, an optical fiber-splicing device in a second aspect of the present invention includes: the optical fiber alignment device according to the first aspect; and a splicing device configured to splice the two optical fibers arranged by the driving device to each other.

In addition, an optical fiber-aligning method in a third aspect of the present invention includes: preparing two optical fibers having two or more cores; capturing images of end surfaces of the two optical fibers; obtaining position coordinates of the two or more cores in the end surfaces from the images captured for each of the two optical fibers; substituting the position coordinates of the two or more cores obtained for each of the two optical fibers in a theoretical equation that represents a total sum of axial deviation losses at the time of splicing the two or more cores to each other; obtaining a positional relationship between the end surfaces of the two optical fibers from the theoretical equation such that the total sum of the axial deviation losses becomes a minimum; and arranging the two optical fibers such that the end surfaces of the two optical fibers satisfy the obtained positional relationship.

In addition, an optical fiber splicing method in a fourth aspect of the present invention includes: splicing the two optical fibers arranged by the optical fiber-aligning method according to the third aspect.

According to the above aspects of the present invention, it is possible to easily align and splice optical fibers such that a total sum of splice losses of all the spliced cores becomes a minimum value (that is, an average splice loss becomes a minimum value).

DETAILED DESCRIPTION OF THE INVENTION

Figure 1:
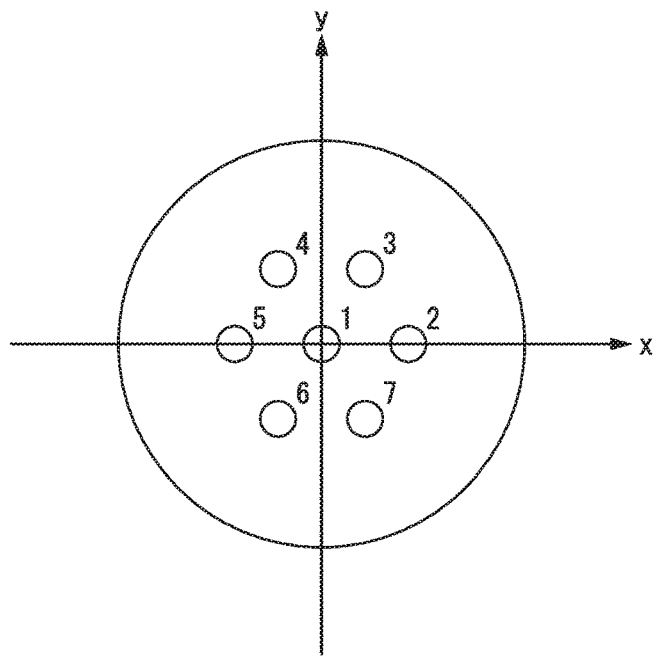
FIG. 1 is an end surface view illustrating an example of arrangement of cores in an end surface of a multi-core fiber.

Hereinafter, the present invention will be described based on a preferable embodiment.

In the present embodiment, in order to acquire a center position of each core in an end surface of two optical fibers facing each other, positional coordinates are obtained using image analysis. An origin of the positional coordinates can be on any arbitrary position. However, if the center of the end surface of each fiber is set as the origin of the coordinates, the description can start in a state in which central axes of the two optical fibers facing each other match each other, and thus, the description can be simplified. Therefore, in the description below, firstly, a case is considered where while one optical fiber (a first optical fiber) is fixed, the other optical fiber (a second optical fiber) has slightly moved from the state in which the central axes of the two optical fibers facing each other match each other. The two optical fibers are multi-core fibers which have the same numbers of cores.

At the end surface of each optical fiber, a sign relating to the fixed optical fiber is defined as A and a sign relating to the slightly moved optical fiber is defined as B. In addition, the number of cores in the optical fiber is defined as n, and sub-numbers A1, A2, . . . , An are given to each core of the optical fiber A and sub-numbers B1, B2, . . . , Bn are given to each core of the optical fiber B. The positional coordinates of each core Ai (i=1, 2, . . . , n) of the optical fiber A are expressed as ($x_{Ai}$, $y_{Ai}$) with the center of the end surface of the optical fiber A as the origin. Similarly, positional coordinates of each core Bi of the optical fiber B are expressed as ($x_{Bi}$, $y_{Bi}$) while defining the center of the end surface of the fixed optical fiber A as the origin. Here, the x axis and y axis in the positional coordinates are regulated as two axes perpendicular to each other in the end surface of each optical fiber using a Cartesian coordinate on the display position coordinates.

In a state in which the central axes of the two optical fibers facing each other match each other, since the center of the end surface of the optical fiber B matches the center of the end surface of the optical fiber A, ($x_{Bi}$, $y_{Bi}$) matches the positional coordinates with which the origin is defined as the center of the end surface of the optical fiber B itself. In a case where the center of the end surface of the optical fiber B is shifted from the center of the end surface of the optical fiber A by the alignment, the displacement due to the shift is required to be considered.

When considering that the main splice loss generated in association with the alignment of the optical fiber is caused by the deviation of the cores, a splice loss S which depends on the alignment technology is expressed by the following equation (1).

$$S = 10\log\left(\exp\left(-\frac{2d^2}{\omega_1^2 + \omega_2^2}\right)\right) \quad (1)$$

Here, d is an amount of axial deviation of the cores, $\omega_1$ is half the mode field diameter ($2\omega_1$) of one spliced core (a first core), and $\omega_2$ is half the mode field diameter ($2\omega_2$) of the other core (a second core). Log is the common logarithm with the base 10. Since only d is changing in the alignment and other values are regarded as constants, the splice loss S is proportional to the square of the amount of axial deviation of the cores d.

When Equation (1) is applied to the multi-core fiber, firstly, a case of splicing the cores having the same sub-numbers can be considered. When performing the alignment of a core Ai of the optical fiber A and a core Bi of the optical fiber B, the amount of axial deviation of the core Ai and the core Bi is assumed to be $d_i$. In this case, the total sum of the splice losses of the multi-core fibers can be estimated as the total sum of each splice loss caused by the axial deviation of each core. Furthermore, the mode field diameters ($2\omega_A$) of each core of the optical fiber A are assumed to be equal to each other and the mode field diameters ($2\omega_B$) of each of cores of the optical fiber B are assumed to be equal to each other. In this case, the total sum of the splice losses of the multi-core fibers is proportional to the total sum of squares of the amount of axial deviation of the core $d_i$. Here, even if $\omega_A$ is not equal to $\omega_B$, in a case where "$\omega_A^2 + \omega_B^2$" is assumed to be a constant, the description can be made in the same manner.

The square of the amount of axial deviation of the core $d_i$ is given as the sum of the squares of the difference of the corresponding coordinates, that is, $[x_{Ai} - x_{Bi}]^2 + [y_{Ai} - y_{Bi}]^2$ from the positional coordinates ($x_{Ai}$, $y_{Ai}$) and ($x_{Bi}$, $y_{Bi}$).

Accordingly, if the position where a value of the following Equation (2) is minimized can be obtained, it is possible to minimize the average splice loss for all the cores.

$$\sum_{i=1}^{n} d_i^2 = \sum_{i=1}^{n} \{[x_{Ai} - x_{Bi}]^2 + [y_{Ai} - y_{Bi}]^2\} \quad (2)$$

That is, an optimal alignment position is obtained by considering the splice losses of all the cores, not by considering only the splice loss (or an amount of axial deviation of the core) of a selected core after selecting an arbitrary core as in the related art.

In the related art, the amount of axial deviation of the selected core can be made completely zero, but in the present embodiment, the amount of axial deviation of any of the one or more cores does not always become completely zero. That is, the minimum splice loss in n cores becomes worse than that in the related art. However, the average splice loss in all of the n cores is improved to be better than that in the related art. In view of an operation of an optical fiber having a plurality of cores, it is apparent that all of the cores are used as optical transmission paths. Therefore, if the cores are aligned and spliced according to the present embodiment, the loss in all of the cores is decreased, and thus, the transmission characteristics in the whole transmission path are improved.

Next, a specific example of an aligning method will be described.

Firstly, coordinate information is obtained, in which the center of each end surface is set as the origin by capturing the images of the end surfaces of each of the two optical fibers facing each other and performing image analysis thereon. Here, if the cores having the same sub-numbers are considered to be spliced, the square of the amounts of axial deviation of the core Ai and the core Bi can be expressed as the coordinate information as described in Equation (2).

Furthermore, under the constraint that the arrangement of the cores is maintained, in order to move a core of the optical fiber to an arbitrary place, a total of three times of movement such as a movement by $\Delta x$ parallel to the x axis direction, a movement by $\Delta y$ parallel to the y axis direction, and a rotational movement by $\Delta\theta$ with the center of the fiber as an axis may be considered. Since a Cartesian coordinate indication is used in the present embodiment, the result of these three movements is not dependent on the order of those movements. First, in the rotational movement, in a case where the optical fiber B is rotated by an angle $\Delta\theta$ with the center of fiber as the axis, the coordinates of the core Bi after the rotation can be obtained as expressed in the following Equation (3).

$$\left(\sqrt{x_{Bi}^2 + y_{Bi}^2} \cos\left(\Delta\theta + \arctan\frac{y_{Bi}}{x_{Bi}}\right), \sqrt{x_{Bi}^2 + y_{Bi}^2} \sin\left(\Delta\theta + \arctan\frac{y_{Bi}}{x_{Bi}}\right)\right) \quad (3)$$

Figure 2:
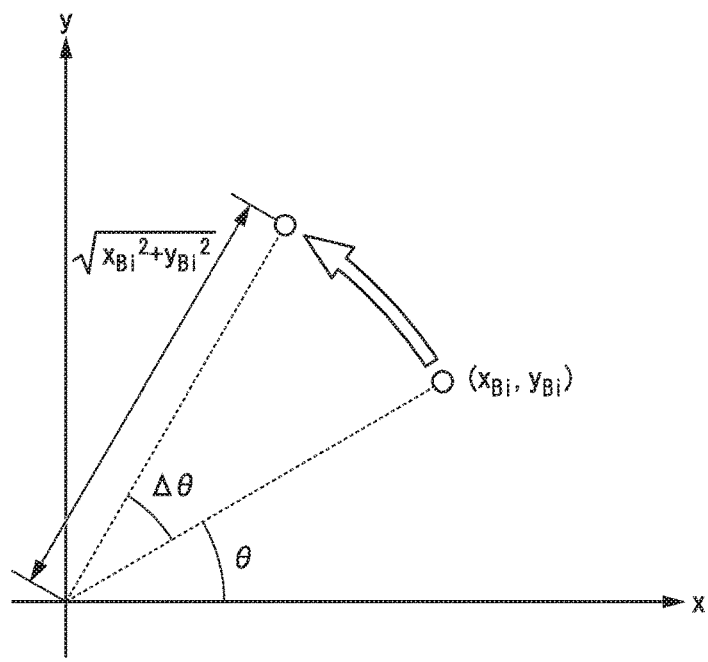
FIG. 2 is an explanatory diagram explaining a change of coordinates due to a rotational movement.

In this regard, to supplement the description, the situations before and after the rotational movement of $\Delta\theta$ are illustrated in FIG. 2. At this time, the declination angle $\theta$ for the coordinates ($x_{Bi}$, $y_{Bi}$) before the rotation is expressed by the following Equation (4).

$$\theta = \arctan \frac{y_{Bi}}{x_{Bi}} \qquad (4)$$

In addition, both before and after the rotational movement, a distance r from the origin does not change, and the distance r is expressed as a square root of $x_{Bi}^2 + y_{Bi}^2$. From the fact that the declination angle after the rotational movement is $\theta + \Delta\theta$, the distance r from the origin and the position of the declination angle $\theta + \Delta\theta$ obtained by the Cartesian coordinate indication is as described above.

In Equation (4), an arc tangent function arctan does not have a main value which is defined in a range of −90° to +90° in a general case, but is defined in a range of −180° to +180° depending on the signs of the $x_{Bi}$ and $y_{Bi}$. For example, in a case where $x_{Bi}$ is zero, $y_{Bi}/x_{Bi}$ becomes ±∞ and the value cannot be determined. However, in Equation (4), when $x_{Bi}=0$ and $y_{Bi}>0$, then, θ is defined as θ=+90°, and when $x_{Bi}=0$ and $y_{Bi}<0$, then, θ is defined as θ=−90°. The arc tangent function according to this definition can be used in many program languages as an "ATAN2" function having two variables.

After the rotational movement of Δθ, when the movement by Δx parallel to the x axis direction and the movement by Δy parallel to the y axis direction are performed, the coordinates of the core Bi after the movement of the fiber can finally be obtained by the following Equation (5).

$$\left( \Delta x + \sqrt{x_{Bi}^2 + y_{Bi}^2} \cos\left(\Delta\theta + \arctan\frac{y_{Bi}}{x_{Bi}}\right), \right. \qquad (5)$$
$$\left. \Delta y + \sqrt{x_{Bi}^2 + y_{Bi}^2} \sin\left(\Delta\theta + \arctan\frac{y_{Bi}}{x_{Bi}}\right) \right)$$

The coordinates of the core Ai of the fixed fiber are maintained as $(x_{Ai}, y_{Ai})$. Accordingly, if the amount of axial deviation between the core Bi of the fiber after the movement and the core Ai of the fixed fiber is expressed as $d_i$ from the fact that the amount of axial deviation after the movement can be obtained as the distance between the core Bi of the fiber after the movement and the core Ai of the fixed fiber, then, the square $d_i^2$ is expressed by the following Equation (6).

$$d_i^2 = \left[ \Delta x - x_{Ai} + \sqrt{x_{Bi}^2 + y_{Bi}^2} \cos\left(\Delta\theta + \arctan\frac{y_{Bi}}{x_{Bi}}\right) \right]^2 + \qquad (6)$$
$$\left[ \Delta y - y_{Ai} + \sqrt{x_{Bi}^2 + y_{Bi}^2} \sin\left(\Delta\theta + \arctan\frac{y_{Bi}}{x_{Bi}}\right) \right]^2$$

Therefore, the splice loss S of the multi-core after the fiber B is moved three times by Δx, Δy, and Δθ can be obtained by the following Equation (7).

$$S \propto \sum_{i=1}^{n} d_i^2 = \sum_{i=1}^{n} \left\{ \left[ \Delta x - x_{Ai} + \sqrt{x_{Bi}^2 + y_{Bi}^2} \cos\left(\Delta\theta + \arctan\frac{y_{Bi}}{x_{Bi}}\right) \right]^2 + \right. \qquad (7)$$
$$\left. \left[ \Delta y - y_{Ai} + \sqrt{x_{Bi}^2 + y_{Bi}^2} \sin\left(\Delta\theta + \arctan\frac{y_{Bi}}{x_{Bi}}\right) \right]^2 \right\}$$

Here, a proportionality coefficient in $S \propto \Sigma d_i^2$ is determined in the mode field as expressed in above Equation (1), but the proportionality coefficient here is a constant. Therefore, in a case of analytically obtaining Δx, Δy, and Δθ such that the value of the right side of Equation (7) is minimized, it is possible to determine the position where the splice loss becomes a minimum. This analysis can be executed in a commercial application such as Excel® from Microsoft® Corporation, USA.

Thus far, the case of splicing cores having the same sub numbers is described. However, of course, this constraint can be removed. In a case of splicing a core Bj (i≠j) other than the core Bi of the optical fiber B with respect to the core Ai of the optical fiber A, Bi can be replaced by Bj corresponding to each i (Ai) in Equations (2) to (7). However, there is a constraint in the sub-numbers that can be dealt with according to the arrangement of the cores.

For example, in a case of a general hexagonal closest arrangement in which one core 1 is arranged at the center and six cores 2, 3, 4, 5, 6 and 7 are arranged on a coaxial circle outside of the core 1 as illustrated in FIG. 1, the core 1 at the center needs to be spliced to the core at the center. In addition, if the core 1 at the center is caused to correspond to any one of the surrounding cores 2 to 7, a maximum of four cores can be spliced, and it is not possible to splice all the seven cores.

Here, it is reasonable to provide a constraint such that a combination in which the core at the center is spliced to a surrounding core is excluded. However, in a case of the surrounding cores 2 to 7, splicing in combinations different from each other according to each of movements of approximately 60° can be performed. That is, in a case where the sub-numbers are determined as illustrated in FIG. 1, in addition to the combination of (A1 and B1, A2 and B2, A3 and B3, A4 and B4, A5 and B5, A6 and B6, and A7 and B7), combinations can be considered such as (A1 and B1, A2 and B3, A3 and B4, A4 and B5, A5 and B6, A6 and B7, and A7 and B2), (A1 and B1, A2 and B4, A3 and B5, A4 and B6, A5 and B7, A6 and B2, and A7 and B3), (A1 and B1, A2 and B5, A3 and B6, A4 and B7, A5 and B2, A6 and B3, and A7 and B4), (A1 and B1, A2 and B6, A3 and B7, A4 and B2, A5 and B3, A6 and B4, and A7 and B5), and (A1 and B1, A2 and B7, A3 and B2, A4 and B3, A5 and B4, A6 and B5, and A7 and B6) (a total of 6 combinations). In any cases of these combinations, in an ideal arrangement in which there are no deviations in the core positions, it is possible to overlap all the cores.

Because which combinations can be used is strongly dependent on the arrangement of the cores, a general discussion is difficult. However, in the ideal arrangement in which there are no deviations in the core positions (or in the arrangement on the design), if there is symmetry such as line symmetry, point symmetry, or rotational symmetry, it is possible to splice all the cores even by replacing the sub-numbers one time or two or more times based on the symmetry of the arrangement of the cores.

Figure 3:
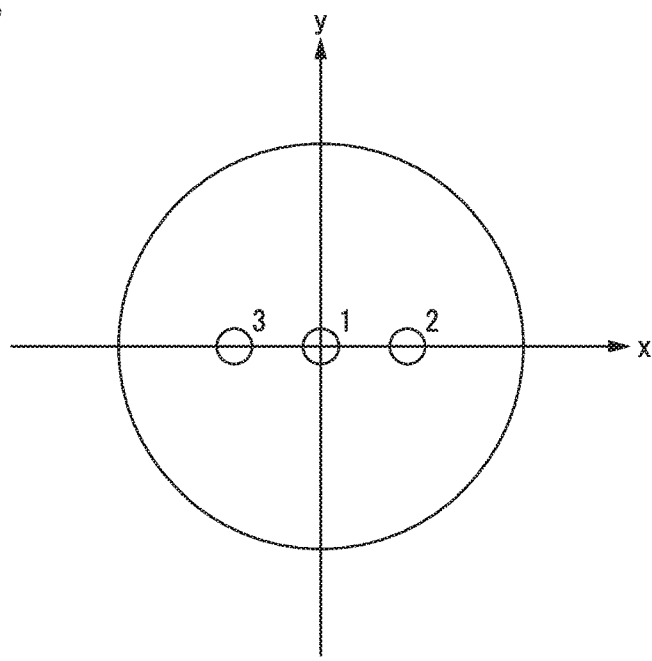
FIG. 3 is an end surface view illustrating another example of arrangement of cores in an end surface of a multi-core fiber.

As illustrated in FIG. 3, in a case where two or more cores are located on a straight line (x-axis) through the origin, the arrangement of the cores is in line symmetry with respect to the y-axis. In a case where sub-numbers are given to three cores as illustrated, in addition to the combination of (A1 and B1, A2 and B2, and A3 and B3), there may be a combination of (A1 and B1, A2 and B3, and A3 and B2) (total 2 combinations). In this type, the number of cores n can be any arbitrary integer equal to or higher than 2.

Figure 4:
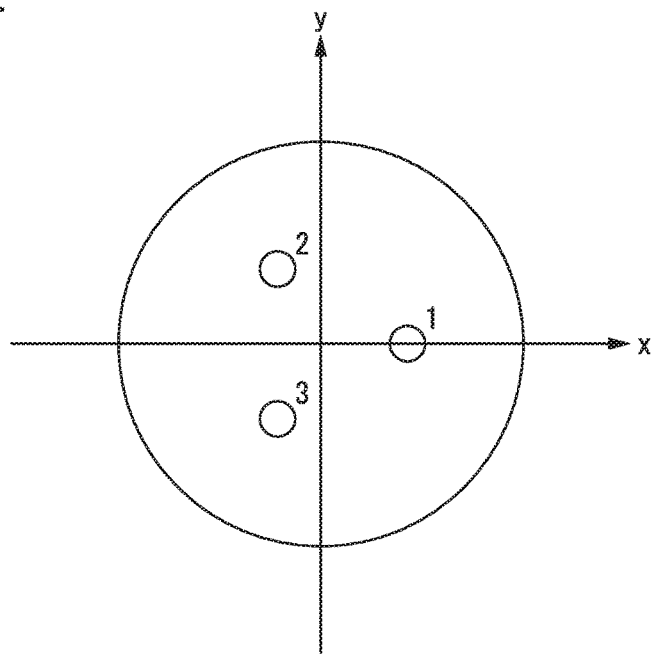
FIG. 4 is an end surface view illustrating still another example of arrangement of cores in an end surface of a multi-core fiber.
Figure 5:
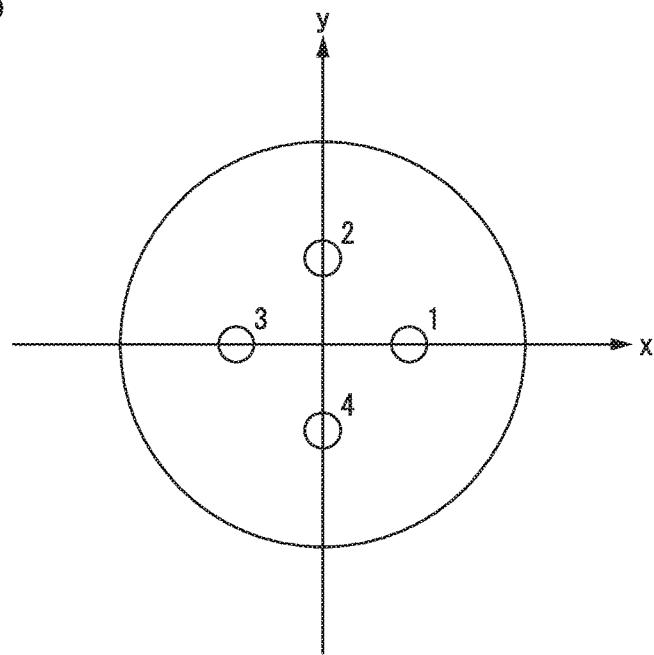
FIG. 5 is an end surface view illustrating still another example of arrangement of cores in an end surface of a multi-core fiber.

As illustrated in FIG. 4 and FIG. 5, in a case where a plurality of (n) cores are located on a concentric circle outside the center of the fiber, the splicing can be performed in combinations different for each (1/n)×360° (total n combinations) by rotational movement with the origin as an axis. In this type, the number of cores n can be any arbitrary integer equal to or higher than 3. The number of cores n is 3 in FIG. 4, and the number of cores n is 4 in FIG. 5.

Figure 6:
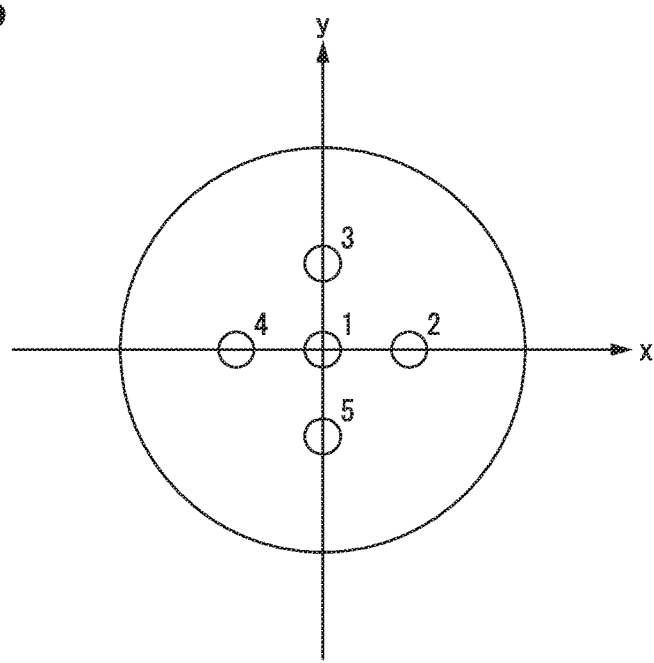
FIG. 6 is an end surface view illustrating still another example of arrangement of cores in an end surface of a multi-core fiber.

In the arrangement of cores in FIG. 6, similarly to that in FIG. 1, one core is located at the center and a plurality of cores are located on a concentric circle outside this core at equal intervals. The number of cores n in FIG. 6 is 5 while the number of cores n in FIG. 1 is 7. In this type, the number of cores n can be any arbitrary integer equal to or higher than 3. When the number of surrounding cores is n−1, the splicing can be performed in combinations different for each (1/(n−1))×360° (total n−1 combinations) by rotational movement with the origin as an axis.

The present embodiment is particularly effective for minimizing the splice loss of the multi-core fiber in such a case where the deviations of the randomly distributed core positions are large due to, for example, the manufacturing lots being different or a large difference in longitudinal positions of the optical fibers. In addition, since the present embodiment can be used even in a multi-core fiber having a complicated structure, the versatility is high. Furthermore, according to the present embodiment, even in a case of splicing multi-core fibers having entirely different structures, it is possible to align the fibers while guaranteeing the theoretically minimum splice loss.

In the above, the present invention is described based on the preferable embodiment. However, the present invention is not limited to the embodiment described above, and various modifications can be made without departing from the present invention.

As described above, the present invention can be embodied in several different flows such as whether or not to provide a constraint on the sub-numbers of the cores to be spliced or to which step priority will be given among steps that have no particular order of priority.

When capturing the images of the end surfaces, it is neither necessary to make the end surfaces of the two optical fibers be in contact with each other, nor necessary to arrange the end surfaces of the two optical fibers in parallel. It is sufficient as long as the relationship between the coordinate system where the images of the end surfaces of two optical fibers is captured and the coordinate system when the end surfaces of the two optical fibers are in contact with each other can be understood. For example, it is preferable to provide a mechanism which measures and controls the position and direction of the optical fiber on a jig that holds the optical fiber. It is preferable to use an imaging element such as CCD camera or a CMOS camera as an image-capturing device because it has a small size and it is easily embedded in an optical fiber-splicer or the like.

When capturing the images of the end surfaces, it is preferable that the central axes of the two optical fibers match each other and the end surfaces of the two optical fibers be arranged in parallel because it is possible to make the end surfaces of the two optical fibers be in contact with each other by simply causing the two optical fibers to be close to each other along the central axis after capturing the images.

Three times of movement $\Delta x$, $\Delta y$, and $\Delta \theta$ can be performed in any order. In addition, the movement $\Delta x$ and the movement $\Delta y$ can be made to be one time movement in a diagonal direction by combining the movement $\Delta x$ and the movement $\Delta y$. One or more movements of $\Delta x$, $\Delta y$, and $\Delta \theta$ can be performed in a state in which the end surfaces of the two optical fibers are in contact with each other, or can be performed in a state in which the end surfaces of the two optical fibers are not in contact with each other.

In an embodiment, an image-analyzing device can determine whether or not the obtained image represents a position on the optical fiber for each pixel of the obtained image, and in addition, can determine whether the obtained image represents the core or the cladding in the optical fiber.

In another embodiment, it is possible to determine the position of a boundary in a unit smaller than one pixel from changes in color information at an external boundary of the optical fiber or at a boundary of the core and cladding. In a case where the boundary position is determined, a range where the core is represented is specified, and thus, the core is extracted one by one. Furthermore, the position coordinates of the center of each core are specified, preferably, and then, it is possible to recognize the number of cores or the arrangement pattern of the cores for each fiber, and then, check whether or not the numbers of cores are the same, and the arrangement patterns of the cores are ideally (that is, in a case where the deviation is ignored) the same.

As an example of the image-analyzing device, similar to the case of a calculation device, a configuration for processing the information by a program on a computer can be used.

The calculation device determines the correspondence relationship between each of cores of the two optical fibers from the number of cores or the arrangement patterns, and then, substitutes the position coordinates of each core in the theoretical equation. The theoretical equation represents the total sum of the axial deviation losses when each core of the two optical fibers is spliced and obtains the position coordinates of each core as variables.

As an example of the calculation device, a configuration of a calculation element such as an integrated circuit for processing the information on a computer can be used.

A driving device holds each of the two optical fibers and causes the end surfaces of the two optical fibers to face each other (to be arranged) such that a positional relationship is made, in which the total sum of the axial deviation losses obtained by the calculation unit becomes a minimum. While one optical fiber (first optical fiber) is fixed, the other optical fiber (second optical fiber) may be moved, or both the optical fibers can be moved. In addition, when capturing the images of the surfaces of the fibers by an image-capturing device, the end surfaces of the two optical fibers are separated in advance, and then, after the alignment, the driving device can be used in order to make the surfaces of the two optical fibers face each other and be in contact with each other.

After aligning the two optical fibers, the two optical fibers may be spliced. The splicing of the two optical fibers may be performed by a mechanical splice in which a tool is attached on the optical fibers such as a "mechanical splice", or may be performed by a physical splice such as a "fusion splice". In a case of the fusion splice, the optical fiber is heated in near the end surface of the optical fiber using a heating device such as an arc-discharger. As an example of a splicing device, there is a splicing tool as a mechanical splice or a heating device as a fusion splice.

Generally, a quartz-based optical fiber is used as the optical fiber, but other types of optical fiber may be used. In a case of considering the deviation of the mode field of each core, the mode field of each core is measured using image analysis, and then, a theoretical equation can be created using the fact that mode fields of each core are different from each other.

Hereinafter, the embodiment of the present invention will be described in detail using an exemplary embodiment.

In the exemplary embodiment, a 7-core fiber which does not include an adjunct such as a marker and the 7-core fiber has a normal hexagonal closest arrangement is used. The fiber is designed with a cladding core diameter of 160 μm and the distance between the cores is 40 μm. Covers are removed from a tip end of each of two optical fibers, and the tip end is cut by a clipper such that the cross-section becomes a plane, and then, the two optical fibers are mounted on the aligning device. In the current exemplary embodiment, a fusion splicer which is movable in three directions of x, y, and θ is used. The central axes of the two optical fibers are aligned by outer diameter alignment, and the image of each end surface is acquired.

From the images of the end surfaces, the position coordinates of the cores are changed such that the center of the fiber becomes the origin. The position coordinates of the cores of the fixed fiber are: A1=(0, 0), A2=(40, 0), A3=(20, 35), A4=(-20, 35), A5=(-40, 0), A6=(-20, -35), and A7=(-20, 35). The position coordinates of the cores of the slightly moved fiber are: B1=(0, 0), B2=(39, 0), B3=(20, 34), B4=(-19, 35), B5=(-40, 0), B6=(-20, -36), and B7=(20, -34). Here, the position coordinates are changed to coordinates in units of 1 μm in order to simplify the numerical values. However, if the accuracy of the coordinates is increased by making the coordinate unit fine, it is possible to obtain more accurate values.

In addition, in the current exemplary embodiment, when aligning the central axes, the core arrangement comes to an almost overlapping position. However, even though the deviation from the initial core arrangement is large, if the coordinates origin can be shared in the end surfaces of both fibers, the present method can be applicable.

Firstly, assuming that the cores having the same sub-numbers are spliced, when the coordinate information obtained by the image analysis is substituted in the theoretical equation, Equation (8) is obtained.

$$S \propto [\Delta x - 0 + \sqrt{0^2 + 0^2} \cos(\Delta\theta + \arctan\frac{0}{0})]^2 + \quad (8)$$
$$[\Delta y - 0 + \sqrt{0^2 + 0^2} \sin(\Delta\theta + \arctan\frac{0}{0})]^2 +$$
$$[\Delta x - 40 + \sqrt{39^2 + 0^2} \cos(\Delta\theta + \arctan\frac{0}{39})]^2 +$$
$$[\Delta y - 0 + \sqrt{39^2 + 0^2} \sin(\Delta\theta + \arctan\frac{0}{39})]^2 +$$
$$[\Delta x - 20 + \sqrt{20^2 + 34^2} \cos(\Delta\theta + \arctan\frac{34}{20})]^2 +$$
$$[\Delta y - 35 + \sqrt{20^2 + 34^2} \sin(\Delta\theta + \arctan\frac{34}{20})]^2 +$$
$$[\Delta x + 20 + \sqrt{(-19)^2 + 35^2} \cos(\Delta\theta + \arctan\frac{35}{-19})]^2 +$$
$$[\Delta y - 35 + \sqrt{(-19)^2 + 35^2} \sin(\Delta\theta + \arctan\frac{35}{-19})]^2 +$$
$$[\Delta x + 40 + \sqrt{(-40)^2 + 0^2} \cos(\Delta\theta + \arctan\frac{0}{-40})]^2 +$$
$$[\Delta y - 0 + \sqrt{(-40)^2 + 0^2} \sin(\Delta\theta + \arctan\frac{0}{-40})]^2 +$$
$$[\Delta x + 20 + \sqrt{(-20)^2 + (-36)^2} \cos(\Delta\theta + \arctan\frac{-36}{-20})]^2 +$$
$$[\Delta y + 35 + \sqrt{(-20)^2 + (-36)^2} \sin(\Delta\theta + \arctan\frac{-36}{-20})]^2 +$$
$$[\Delta x - 20 + \sqrt{20^2 + (-34)^2} \cos(\Delta\theta + \arctan\frac{-34}{20})]^2 +$$

-continued
$$[\Delta y + 35 + \sqrt{20^2 + (-34)^2} \sin(\Delta\theta + \arctan\frac{-34}{20})]^2$$

It may be sufficient that $\Delta x$, $\Delta y$, and $\Delta\theta$ which make the right side of this Equation (8) be a minimum value can be obtained. When obtaining a value up to the third decimal place after the decimal point by increasing the number of digits higher than the number of significant figures, the following result can be obtained.

$\Delta x=0.000$, $\Delta y=0.143$, and $\Delta\theta=0.002$.

In the current exemplary embodiment, if the position coordinates are moved by approximately 0.14 μm in the +y direction, it is possible to achieve a minimum splice loss.

What is claimed is:

1. An optical fiber alignment device for aligning optical fibers having two or more cores, the device comprising:
   an image-capturing device capturing images of end surfaces of two optical fibers, the two optical fibers being a first optical fiber having two or more cores and a second optical fiber having two or more cores;
   an image-analyzing device obtaining position coordinates of the two or more cores of the first optical fiber and the two or more cores of the second optical fiber in the end surfaces from the images captured by the image-capturing device for each of the two optical fibers;
   a calculation device comprising non-transitory memory media processing information of the position coordinates of the two or more cores of the first optical fiber and the two or more cores of the second optical fiber obtained for each of the two optical fibers, the non-transitory memory media storing a theoretical equation that represents a total sum of axial deviation losses at the time of splicing the two or more cores of the first optical fiber and the two or more cores of the second optical fiber to each other, the calculation device substituting the position coordinates in the theoretical equation by changing a combination of the two or more cores of the first optical fiber and the two or more cores of the second optical fiber to be connected, the calculation device obtaining a positional relationship between the end surfaces of the two optical fibers from the theoretical equation in a combination of the two or more cores of the first optical fiber and the two or more cores of the second optical fiber where the total sum of the axial deviation losses becomes a minimum; and
   a driving device arranging the two optical fibers such that the end surfaces of the two optical fibers satisfy the positional relationship obtained by the calculation device, the driving device aligning the two optical fibers such that the second optical fiber is moved by a rotational movement about a center of an end surface of the first optical fiber.

2. An optical fiber-splicing device comprising:
   the optical fiber alignment device according to claim 1; and
   a splicing device splicing the two optical fibers arranged by the driving device to each other.

3. An optical fiber-aligning method comprising:
   preparing two optical fibers being a first optical fiber having two or more cores and a second optical fiber having two or more cores;
   capturing images of end surfaces of the two optical fibers;
   obtaining position coordinates of the two or more cores of the first optical fiber and the two or more cores of the second optical fiber in the end surfaces from the images captured for each of the two optical fibers;

substituting the position coordinates of the two or more cores of the first optical fiber and the two or more cores of the second optical fiber obtained for each of the two optical fibers in a theoretical equation that represents a total sum of axial deviation losses at the time of splicing the two or more cores of the first optical fiber and the two or more cores of the second optical fiber to each other by changing a combination of the two or more cores of the first optical fiber and the two or more cores of the second optical fiber to be connected;

obtaining a positional relationship between the end surfaces of the two optical fibers from the theoretical equation in a combination of the two or more cores of the first optical fiber and the two or more cores of the second optical fiber where the total sum of the axial deviation losses becomes a minimum; and arranging the two optical fibers such that the end surfaces of the two optical fibers satisfy the obtained positional relationship by aligning the two optical fibers so as to move the second optical fiber by a rotational movement about a center of an end surface of the first optical fiber.

4. An optical fiber splicing method comprising: splicing the two optical fibers arranged by the optical fiber-aligning method according to claim 3.

5. The optical fiber alignment device according to claim 1, wherein the driving device aligns the two optical fibers such that the second optical fiber is moved by the rotational movement with a central axis of the first optical fiber as a rotation axis.

6. The optical fiber-aligning method according to claim 3, wherein when arranging the two optical fibers, the two optical fibers are arranged so that the end surfaces of the two optical fibers satisfy the obtained positional relationship by aligning the two optical fibers so as to move the second optical fiber by the rotational movement with a central axis of the first optical fiber as a rotation axis.

7. The optical fiber alignment device according to claim 1, wherein the theoretical equation is based on the following expression (6) showing a square of an axial deviation loss $d_i$ in the axial deviation losses:

$$d_i^2 = \left[\Delta x - x_{Ai} + \sqrt{x_{Bi}^2 + y_{Bi}^2}\cos\left(\Delta\theta + \arctan\frac{y_{Bi}}{x_{Bi}}\right)\right]^2 + \left[\Delta y - y_{Ai} + \sqrt{x_{Bi}^2 + y_{Bi}^2}\sin\left(\Delta\theta + \arctan\frac{y_{Bi}}{x_{Bi}}\right)\right]^2 \quad (6)$$

variables in the expression (6) are as follows, i: a core number in the cores of the first optical fiber and the cores of the second optical fiber, $x_{Ai}$: an x coordinate of one of the cores in the first optical fiber, $y_{Ai}$: a y coordinate of said one of the cores in the first optical fiber, $x_{Bi}$: an x coordinate of one of the cores in the second optical fiber, $y_{Bi}$: a y coordinate of said one of the cores in the second optical fiber, Δx: an amount of a deviation of said one of the cores in the second optical fiber in an x axis direction from the center of the first optical fiber, Δy: an amount of a deviation of said one of the cores in the second optical fiber in a y axis direction from the center of the first optical fiber, and Δθ: an angle where the second optical fiber to be moved by the rotational movement about the center of the end surface of the first optical fiber.

8. The optical fiber-aligning method according to claim 3, wherein the theoretical equation is based on the following expression (6) showing a square of an axial deviation loss $d_i$ in the axial deviation losses:

$$d_i^2 = \left[\Delta x - x_{Ai} + \sqrt{x_{Bi}^2 + y_{Bi}^2}\cos\left(\Delta\theta + \arctan\frac{y_{Bi}}{x_{Bi}}\right)\right]^2 + \left[\Delta y - y_{Ai} + \sqrt{x_{Bi}^2 + y_{Bi}^2}\sin\left(\Delta\theta + \arctan\frac{y_{Bi}}{x_{Bi}}\right)\right]^2 \quad (6)$$

variables in the expression (6) are as follows, i: a core number in the cores of the first optical fiber and the cores of the second optical fiber, $x_{Ai}$: an x coordinate of one of the cores in the first optical fiber, $y_{Ai}$: a y coordinate of said one of the cores in the first optical fiber, $x_{Bi}$: an x coordinate of one of the cores in the second optical fiber, $y_{Bi}$: a y coordinate of said one of the cores in the second optical fiber, Δx: an amount of a deviation of said one of the cores in the second optical fiber in an x axis direction from the center of the first optical fiber, Δy: an amount of a deviation of said one of the cores in the second optical fiber in a y axis direction from the center of the first optical fiber, and Δθ: an angle where the second optical fiber to be moved by the rotational movement about the center of the end surface of the first optical fiber.

\* \* \* \* \*